US009430708B2

United States Patent
Han et al.

(10) Patent No.: US 9,430,708 B2
(45) Date of Patent: Aug. 30, 2016

(54) METHOD OF DETECTING PEDESTRIANS USING INTEGRAL IMAGE OF FEATURE INFORMATION, COMPUTER READABLE RECORDING MEDIUM, AND TERMINAL DEVICE FOR THE SAME

(71) Applicant: Foundation of Soongsil University-Industry Cooperation, Seoul (KR)

(72) Inventors: Youngjoon Han, Seoul (KR); Jaedo Kim, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 0 days.

(21) Appl. No.: 14/550,745

(22) Filed: Nov. 21, 2014

(65) Prior Publication Data

US 2015/0186736 A1 Jul. 2, 2015

(30) Foreign Application Priority Data

Dec. 27, 2013 (KR) ........................ 10-2013-0164768

(51) Int. Cl.
*G06K 9/00* (2006.01)
*G06K 9/46* (2006.01)

(52) U.S. Cl.
CPC ....... *G06K 9/00805* (2013.01); *G06K 9/00362* (2013.01); *G06K 9/4614* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,315,631 | B1* | 1/2008 | Corcoran | G06K 9/00234 382/118 |
| 7,403,643 | B2* | 7/2008 | Ianculescu | G06K 9/00228 382/118 |
| 7,916,897 | B2* | 3/2011 | Corcoran | G06K 9/00228 382/103 |
| 8,295,543 | B2* | 10/2012 | Tu | G06K 9/3216 382/103 |
| 8,503,800 | B2* | 8/2013 | Blonk | G06K 9/00261 382/224 |
| 9,082,002 | B2* | 7/2015 | Tsukizawa | G06K 9/00255 |
| 9,092,695 | B1* | 7/2015 | Ogale | G06K 9/6202 |
| 2002/0102024 | A1 | 8/2002 | Jones et al. | |
| 2009/0226047 | A1* | 9/2009 | Yu | G06K 9/00248 382/118 |

(Continued)

FOREIGN PATENT DOCUMENTS

| JP | 2008-27275 A | 2/2008 |
|---|---|---|
| JP | 2011-180792 A | 9/2011 |

OTHER PUBLICATIONS

Kwon, Young-Man et al. "Fast Video Stabilization Method Using Integral Image." The Journal of the Institute of Webcasting, Internet and Telecomunication. vol. 10, No. 5, pp. 13-20. Oct 2010.

(Continued)

*Primary Examiner* — Anand Bhatnagar
(74) *Attorney, Agent, or Firm* — Novick, Kim & Lee, PLLC; Sang Ho Lee

(57) ABSTRACT

Provided is a method of detecting a pedestrian through feature information prediction based on an integral image. The method includes extracting a feature image of an obtained original image; generating an integral image of the feature image; predicting an integral image of an enlarged/reduced feature image using the integral image of the feature image and an image enlargement/reduction scale value; and detecting a pedestrian using an integral image of the predicted enlarged/reduced feature image. Accordingly, it is possible to decrease a time taken for a feature extracting operation, and perform pedestrian detection efficiently.

12 Claims, 8 Drawing Sheets

(56) References Cited

U.S. PATENT DOCUMENTS

2013/0142416 A1* 6/2013 Tsukizawa ......... G06K 9/00255
382/154
2015/0242694 A1* 8/2015 Miyagawa ................ B60R 1/00
382/103

OTHER PUBLICATIONS

Suh, Ki-Bum et al. "A Realtime Hardware Design for Face Detection." Journal of the Korea Institute of Information and Communication Engineering. vol. 17, No. 2, pp. 397-404. Feb. 2013.

Benenson, Rodrigo et al. "Pedestrian Detection at 100 Framers per Second." In the IEEE Conference on Computer Vision and Pattern Recognition, pp. 2903-2910. Jun. 16-21, 2012.

Dollar, Piotr et al. "The Fastest Pedestrian Detector in the West." In the British Machine Vision Conference, pp. 68.1-68.11. Aug. 21-Sep. 3, 2010.

Ki-Yeong Park et al., "An Improved Normalization Method for Haar-like Features for Real-time Object Detection", The Journal of Korean Institute of Communications and Information Sciences, Aug. 2011, vol. 36 No. 8, pp. 505-515.

* cited by examiner

N Model, 1 Image Size

1 Model, N Image Size

N Model, K Image Size

METHOD OF DETECTING PEDESTRIANS USING INTEGRAL IMAGE OF FEATURE INFORMATION, COMPUTER READABLE RECORDING MEDIUM, AND TERMINAL DEVICE FOR THE SAME

CROSS-REFERENCE TO RELATED APPLICATION

This application claims priority to and the benefit of Korean Patent Application No. 2013-0164768, filed on Dec. 27, 2013, the disclosure of which is incorporated herein by reference in its entirety.

BACKGROUND OF INVENTION

The present invention relates to a method of detecting a pedestrian, and a recording medium and a terminal for performing the method, and more specifically, to a method of detecting a pedestrian through feature information prediction based on an integral image to be applied to pedestrian detection that is performed in advance to avoid collisions with the pedestrian, and a recording medium and a terminal for performing the method.

According to a report on occurrence of traffic accidents (injuries and deaths) for the past decade by the National Police Agency, 200 thousand or more traffic accidents occur every year, 300 thousand or more people are injured in accidents and 5000 or more people die. A rate of pedestrian deaths with respect to total deaths from traffic accidents is as high as 40%. While safety devices such as mandatory air bags for the safety of drivers and passengers and mandatory seat belts are being significantly enforced, there is no safety device for pedestrians. Therefore, interest in pedestrian safety is increasing. Recently, laws mandating mounting of a vehicle pedestrian safety system have been enacted in places such as Europe and the USA.

In 2003, in Europe, in order to minimize damage resulting from shock when a vehicle collides with a pedestrian, regulations defining maximum impact for individual body parts were enacted. In 2008, regulations defining active safety requirements for detecting a pedestrian near a vehicle and providing a warning for a driver were enacted. In addition, an addition of an automatic braking system as a vehicle evaluation item in 2014 was announced.

Such a pedestrian protection system is broadly classified as pedestrian detection and collision avoidance control. Pedestrian detecting technology serving as a reference of collision avoidance is key technology. Forward obstacle detecting technology using radar has excellent accuracy, but it takes a long time for searching and it is difficult to respond to traffic accident events. Accordingly, research on uses of advanced computer vision technology and relatively inexpensive camera systems is underway.

In particular, recently, when a single channel feature is used to classify the pedestrian, an operation time is short since a feature extracting operation does not consume much time. However, in order to build a reference that can classify the pedestrian more clearly, a method in which image features of various channels are extracted and comprehensively used to detect an object was proposed. When a partial region of an input image and a model are compared in order to detect various pedestrians and a feature vector formed of a combination of features of the partial region is generated, a repetitive computation operation is performed. In this case, in order to decrease time consumption, a method of using an integral image of channel features is widely used. However, there is a problem in that a feature should be redetected whenever a size of the input image is adjusted.

In order to improve the above-described problem, in the paper of Dollár et al. (The fastest pedestrian detector in the west, P. Dollár, S. Belongie, and P. Perona, In the British Machine Vision Conference, 21 Aug. 3 Sep., 2010), a channel feature proposed by themselves was used, both a pedestrian model and an input image were changed, the number of operations was reduced, a feature was not redetected in an image that is changed to various sizes, a feature was predicted using only a scale value based on a feature of the input image, and therefore a feature extracting operation was simplified.

Meanwhile, as another method of decreasing the operation time, Benenson et al. (Pedestrian detection at 100 frames per second, R. Benenson, M. Mathias, R. Timofte, and L. Van Gool, In the IEEE Conference on Computer Vision and Pattern Recognition, pp. 2903-2910, 16-21 Jun., 2012) proposed a method in which a search region itself was reduced based on distance information obtained through stereo vision.

However, according to the above method, in order to improve performance of pedestrian detection, various image features are used in combinations, and a plurality of repetitive search operations are necessary to detect the pedestrian in various sizes. In this case, a plurality of repetitive operations such an enlargement/reduction of the image, resulting feature extraction, and feature vector generation, and the like are performed. Therefore, in the related art, there is a problem in that an operation speed is low and separate hardware such as a stereo vision and a GPU needs to be used in order to decrease an operation time. Also, a system building cost significantly increases accordingly.

SUMMARY OF THE INVENTION

In view of the above-described problems, the present invention provides a method of detecting a pedestrian through feature information prediction based on an integral image.

The present invention also provides a recording medium for performing the method.

The present invention also provides a pedestrian detecting terminal for performing the method.

According to an aspect of the present invention, there is provided a method of detecting a pedestrian through feature information prediction based on an integral image. The method includes extracting a feature image of an obtained original image; generating an integral image of the feature image; predicting an integral image of an enlarged/reduced feature image using the integral image of the feature image and an image enlargement/reduction scale value; and detecting a pedestrian using an integral image of the predicted enlarged/reduced feature image.

In the predicting an integral image of an enlarged/reduced feature image, a value of a point in the integral image of the feature image enlarged/reduced by a factor of K may be obtained by increasing a corresponding point value of the integral image of the feature image of the original image by a factor of $k^2$.

In the predicting an integral image of an enlarged/reduced feature image, the following equation may be used, $$II_R(x, y) = k^2 II(x/k, y/k)$$

where, k denotes an enlargement/reduction scale, II denotes an integral image of a feature image of an original image, and $II_R$ denotes an integral image of the enlarged/reduced feature image.

In the extracting a feature image of an obtained original image, an image of each channel feature may be extracted, and wherein, in the generating an integral image of the feature image, an integral image may be generated for each channel feature of the original image.

The method may further include extracting a region of interest of the obtained original image, wherein, when the region of interest is greater than a pedestrian model, the pedestrian model is enlarged, and when the region of interest is smaller than the pedestrian model, the original image is enlarged.

The method may further include recognizing a pedestrian in which the predicted integral image of the enlarged/reduced feature image is used to determine the pedestrian.

According to another aspect of the present invention, there is provided a computer readable storage medium. A computer program for performing the method of detecting a pedestrian through feature information prediction based on an integral image is recorded therein.

According to still another aspect of the present invention, there is provided a pedestrian detecting terminal. The terminal includes a camera unit configured to obtain an original image; a feature information predicting unit configured to predict an integral image of an enlarged/reduced image using an integral image of the obtained original image and an image enlargement/reduction scale value; and a pedestrian detecting unit configured to detect a pedestrian based on the predicted integral image of the enlarged/reduced image.

The feature information predicting unit may include a channel feature extracting unit configured to extract a channel feature from the obtained original image; an integral image generating unit configured to generate an integral image of the channel feature; and an integral image predicting unit configured to predict an integral image of an enlarged/reduced channel feature using the integral image of the channel feature and the image enlargement/reduction scale value.

The terminal may further include a pedestrian recognizing unit configured to determine a pedestrian using the predicted integral image of the enlarged/reduced channel feature.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, exemplary embodiments of the present invention will be described in greater detail with reference to the accompanying drawings.

Figure 1:
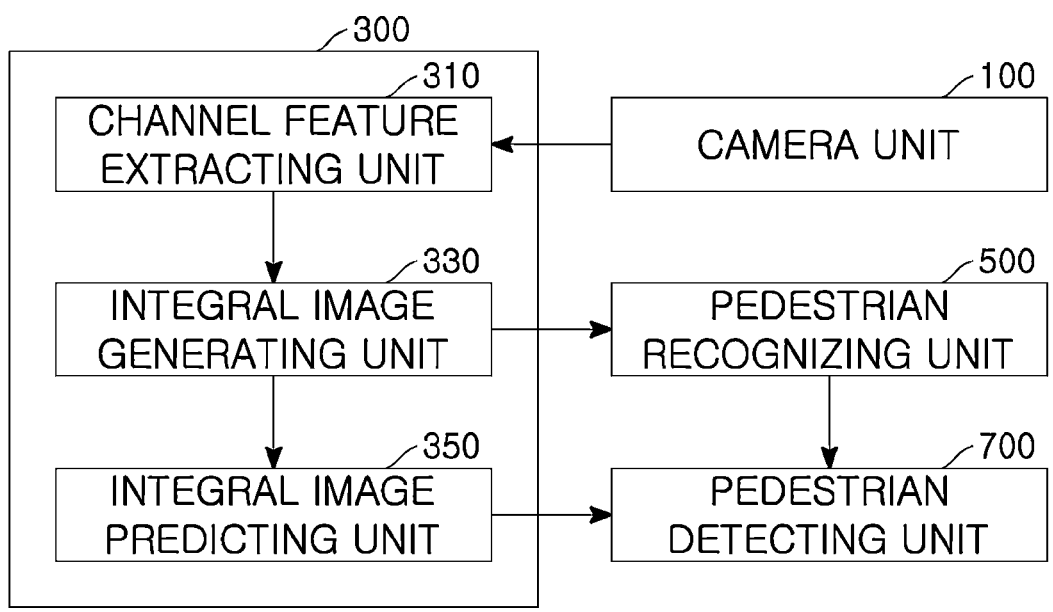
FIG. 1 is a block diagram illustrating a pedestrian detecting terminal using feature information prediction based on an integral image according to an embodiment of the present invention.

FIG. 1 is a block diagram illustrating a pedestrian detecting terminal using feature information prediction based on an integral image according to an embodiment of the present invention.

As illustrated in FIG. 1, a pedestrian detecting terminal 10 using feature information prediction includes a camera unit 100, a feature information predicting unit 300, and a pedestrian detecting unit 700. The terminal 10 may further include a pedestrian recognizing unit 500.

The pedestrian detecting terminal 10 may be mounted in transportation systems such as a vehicle, a bus, a train, and a subway or may be installed in a road, an airport, a bridge, a rail, and the like. In addition, each of the camera unit 100, the feature information predicting unit 300, the pedestrian detecting unit 700, the pedestrian recognizing unit 500, and the like may be formed in a separate module or may be integrally formed in at least one module.

Pedestrian detection technology is technology for detecting a pedestrian and controlling collision avoidance for pedestrian safety and the like, and pedestrian detection serving as a reference of collision avoidance should be performed in advance. The camera unit 100 obtains an original image for detecting the pedestrian. The original image may include a pedestrian candidate or a region of interest.

The feature information predicting unit 300 extracts feature information from an image in order to classify and track the pedestrian. Specifically, the feature information predicting unit 300 predicts an integral image of an enlarged/reduced image using the integral image of the obtained original image and an image enlargement/reduction scale value.

The pedestrian recognizing unit 500 determines whether the pedestrian candidate or the region of interest is a pedestrian using feature information provided from the feature information predicting unit 300. The pedestrian detecting unit 700 tracks the pedestrian by detecting a movement direction or a trajectory of the detected pedestrian.

In the pedestrian detection technology, feature extraction of the image consumes the greatest amount of time and load in an algorithm of the pedestrian detection technology. This is because, in order to detect the pedestrian in various sizes, searching should be performed several times using the pedestrian model of various sizes and a feature extracting operation should be repeatedly performed on an original image in various sizes.

Therefore, in the present invention, an integral image of the enlarged/reduced image is predicted using the integral image of the obtained original image and the image enlargement/reduction scale value, and an operation of repeatedly integrating the image is not provided, thereby decreasing a time taken for feature extraction of the image.

For this purpose, the feature information predicting unit 300 includes a channel feature extracting unit 310, an integral image generating unit 330, and an integral image predicting unit 350.

The channel feature extracting unit 310 extracts a feature image from the original image obtained by the camera unit 100. The feature image may be an image of each channel feature. Also, while the feature image may be directly extracted from the original image, the region of interest may be extracted from the original image and then a feature image of the region of interest may be extracted.

The integral image generating unit 330 generates an integral image of the channel feature. The integral image predicting unit 350 predicts an integral image of an enlarged/reduced channel feature using the integral image of the channel feature and the image enlargement/reduction scale value. The integral image generating unit 330 may generate an integral image for each channel feature.

A method of predicting feature information in the feature information predicting unit 300 will be described in detail below with reference to FIGS. 2 to 6.

Figure 2:
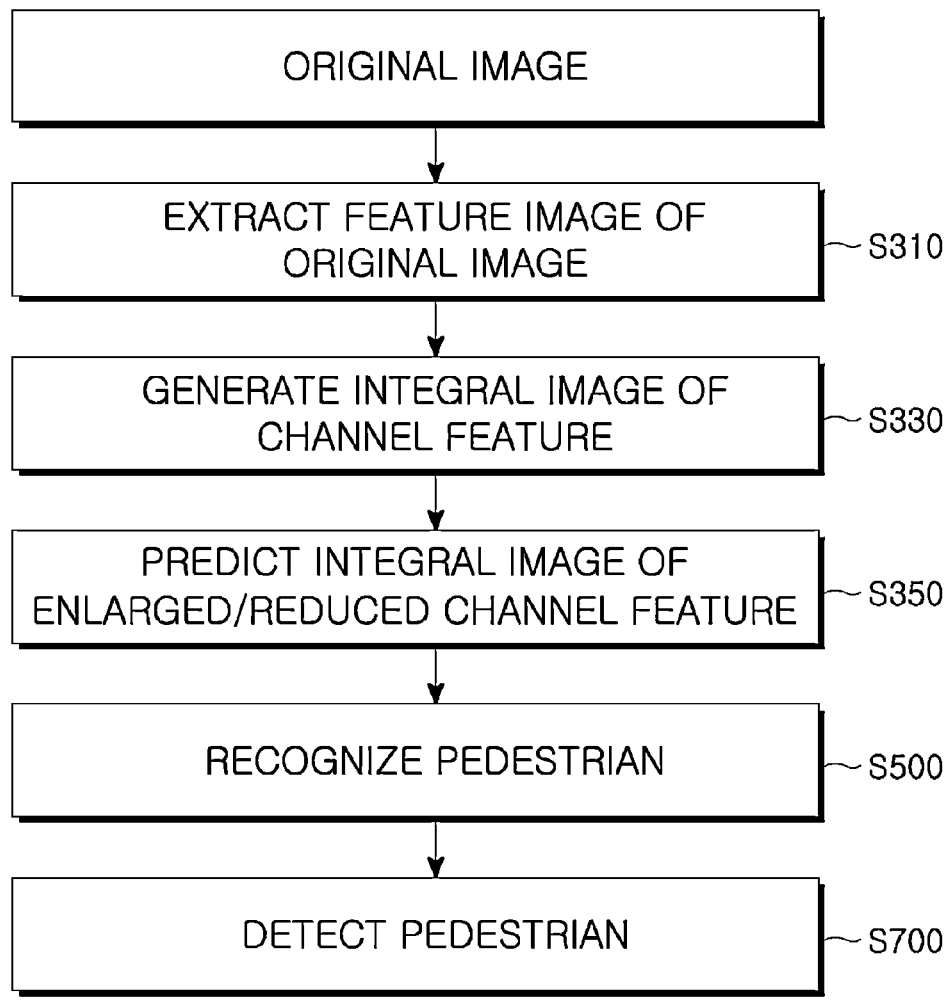
FIG. 2 is a flowchart illustrating a method of detecting a pedestrian using feature information prediction based on an integral image according to an embodiment of the present invention.

FIG. 2 is a flowchart illustrating a method of detecting a pedestrian using feature information prediction based on an integral image according to an embodiment of the present invention.

The method of detecting a pedestrian using feature information prediction according to this embodiment may be performed in a configuration that is substantially the same as that of the terminal 10 of FIG. 1. Therefore, the same reference numerals are assigned to components that are the same as those in the terminal 10 of FIG. 1, and redundant descriptions will not be provided.

As illustrated in FIG. 2, a method of detecting a pedestrian using feature information prediction according to this embodiment predicts an integral image of the enlarged/reduced image using an integral image of an original image obtained by a camera and an image enlargement/reduction scale value.

For this purpose, a feature image of the obtained original image, that is, an image of each channel feature is extracted (operation S310). Feature information of the image that may be obtained from a single image includes colors (such as RGB, YCbCr, and LUV), a gray scale represented as only a brightness value, gradients representing a gradient direction and an increase rate of a brightness value, a gradient histogram in which a histogram of a number or an amount thereof is provided for each direction of a gradient, and a texture representing smoothness. Image features that can be obtained from a plurality of images include a difference image representing a change between frames, a motion representing a movement change over time, and the like. Each of the features is defined as a channel feature of the image.

The channel feature itself is used as a feature for classifying an object. However, when only a single feature is used to describe a specific object, accuracy decreases. Also, color information becomes diverse according to clothes worn by the pedestrian and the pedestrian has various appearances according to movement while walking. Therefore, accuracy may be increased by combining a local distribution of a single feature or combining various channel features using a feature value of a specific region of a beneficial specific channel selected using a boosting algorithm.

Meanwhile, before the operation of extracting the feature image (operation S310), a preprocessing operation of enhancing an image quality of the original image and detecting the pedestrian candidate or extracting the region of interest may be performed. In order to detect the pedestrian in various sizes in the original image, a method in which a size of a pedestrian model is changed and applied to an original image of a fixed size as illustrated in FIG. 3(*a*), a method in which a pedestrian model is applied to an original image that is changed to various sizes as illustrated in FIG. 3(*b*), and a method in which both sizes of a pedestrian model and an original image are changed and applied as illustrated in FIG. 3(*c*) may be generally used.

Figure 4:
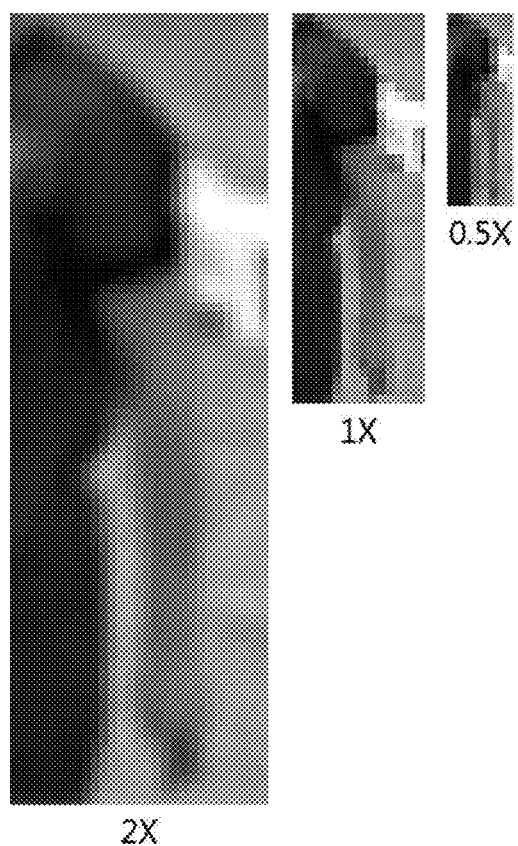
FIG. 4 shows exemplary screens for showing an influence of enlargement/reduction of an image.

Generally, when the image is reduced, as a size thereof becomes smaller, a characteristic of the original image may be easily lost as illustrated in FIG. 4. In an image that is reduced to half in FIG. 4, it may be observed that a boundary between an arm and the torso becomes unclear. On the other hand, an image that is enlarged by a factor of two, it may be observed that a boundary is still clearly visible. In particular, since the pedestrian model is a vector in which features of internal partial regions are combined, when the region is reduced, a feature of a trained model is not maintained, which results in a significant degradation of detection performance.

Figure 3A:
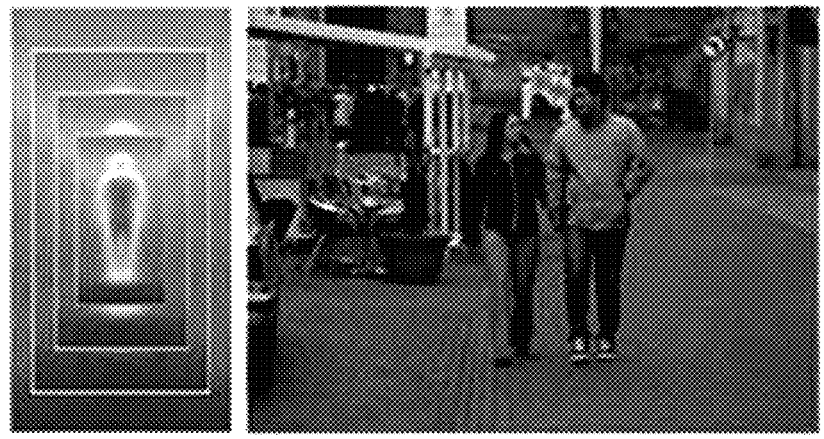
FIGS. 3(a)-3(c) are diagrams illustrating a concept in which a size of a pedestrian model or an original image is changed for pedestrian detection.
Figure 3B:
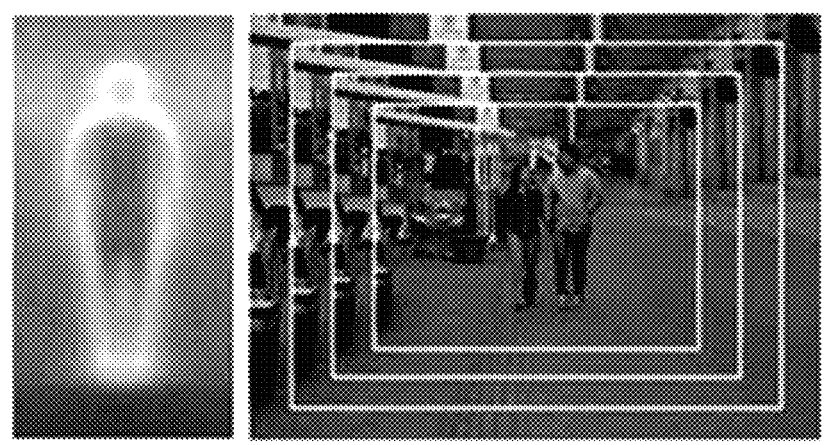
Figure 3C:
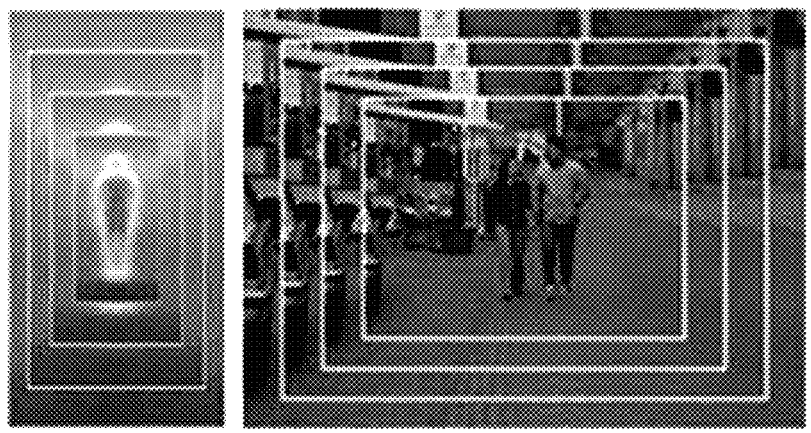

In order to prevent the above-described problem, as illustrated in FIGS. 3(*a*)-3(*c*), N models for each size may be trained and used. However, in this case, since a plurality of models should be generated, a learning time significantly increases. Also, since the plurality of models should be applied for detection, a detection time also significantly increases.

Figure 5:
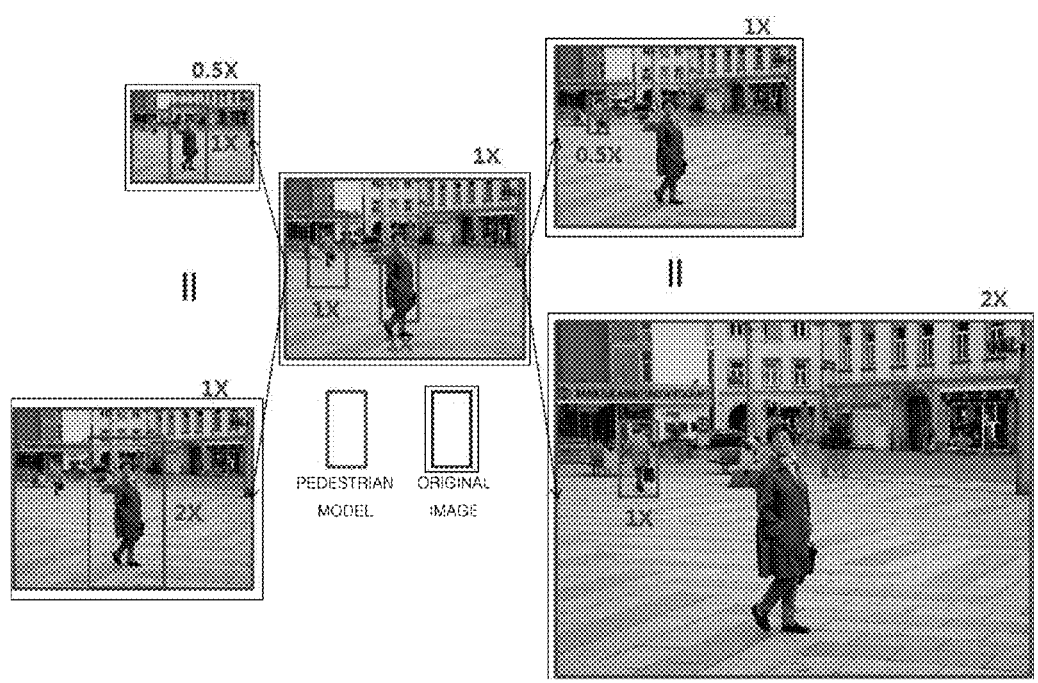
FIG. 5 shows exemplary screens for showing a relation of a pedestrian model and enlargement/reduction of an original image according to the present invention.
Figure 6A:
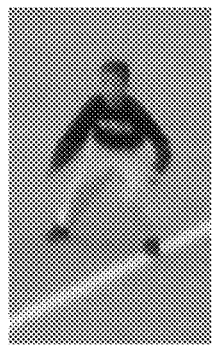
FIGS. 6(a)-6(e) show screens in which an integral image of a feature image of an image obtained by enlarging an original image by a factor of two according to the present invention and a predicted integral image of twice the size according to the present invention are compared.
Figure 6B:
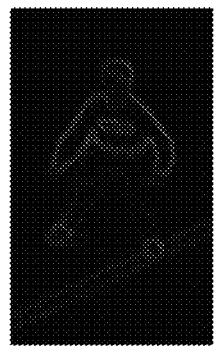
Figure 6C:
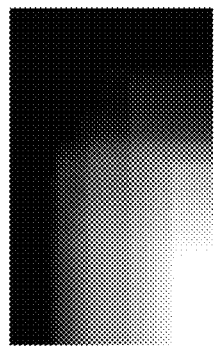
Figure 6E:
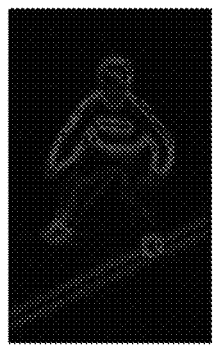
Figure 6D:
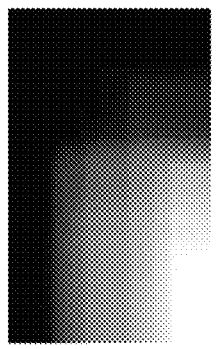

In order to address such problems, image enlargement is used instead of image reduction in the present invention. As illustrated in FIG. 5, a factor of k of the original image may have the same meaning as a factor of 1/k of the pedestrian model, and a factor of k of the pedestrian model may have the same meaning as a factor of 1/k of the original image. Therefore, in the present invention, a method in which the pedestrian model is enlarged in order to detect a pedestrian greater than the pedestrian model and the original image is enlarged in order to detect a pedestrian smaller than the pedestrian model is used to minimize an information loss that can be generated in reduction. In this manner, after the preprocessing operation in which the region of interest or the pedestrian candidate is extracted from the obtained original image is performed, the feature image may be extracted.

Then, an integral image of the extracted feature image is generated (operation S330). Specifically, an integral image is generated for each channel feature of the original image. In the related art, in order to detect the pedestrian in various sizes, the original image was enlarged/reduced, each channel feature of each enlarged/reduced image was extracted, and then the integral image was generated. In this case, there was a problem in that the feature extracting operation was repeatedly performed according to enlargement/reduction of the image, thereby increasing an operation time.

On the other hand, since only the integral image of the original image is generated in the present invention, image enlargement/reduction and repetition of channel feature prediction are not provided. As a result, it is possible to significantly decrease an operation time.

After the integral image of the feature image of the original image is generated, an integral image of the enlarged/reduced feature image is predicted using the integral image of the feature image and the image enlargement/reduction scale value (operation S350).

Hereinafter, a method of predicting an integral image of the feature image enlarged/reduced in operation S330 will be described with reference to, equations. The integral image is an image in which a sum of previous pixels is added to a current pixel. A general equation for generating the integral image is defined as the following Equation 1.

$$II(x, y) = \sum_{y'=0}^{y} \sum_{x'=0}^{x} I(x', y') \quad \text{[Equation 1]}$$

Here, I denotes an original image, and II denotes an integral image of the original image. II(x, y) denotes a value of a pixel (x, y) of the integral image and denotes a cumulative sum of all pixel values from a pixel (0, 0) to a pixel (x, y) of the original image I.

An integral image of an image that is enlarged/reduced by a factor of k by applying a nearest neighbor interpolation is defined by the following Equation 2.

$$II_R(x, y) = \sum_{y'=0}^{y} \sum_{x'=0}^{x} I_R(x', y') \quad \text{[Equation 2]}$$

Here, $I_R$ denotes an enlarged/reduced image, and $II_R$ denotes an integral image of the enlarged/reduced image. A size of a region to be integrated in the enlarged/reduced $I_R$ is $k^2$ times a region size corresponding to the original image I as represented in the following Equation 3.

$$\text{Area}(I_R(x, y)) = k^2 \text{Area}(I(x/k, y/k)) \quad \text{[Equation 3]}$$

Here, k denotes an enlargement/reduction scale, and Area (I(x, y)) denotes a region size from (0, 0) to (x, y) of the image. Using Equation 3, $II_R$ can be rephrased as the following Equation 4.

$$II_R(x, y) = k^2 \sum_{y'=0}^{y/k} \sum_{x'=0}^{x/k} I(x', y') \quad \text{[Equation 4]}$$

When the definition of Equation 1 is used, since the integral part of Equation 4 is the same as that of Equation 5, an integral image of the enlarged/reduced image is finally represented as Equation 6.

$$\sum_{y'=0}^{y/k} \sum_{x'=0}^{x/k} I(x', y') = II(x/k, y/k) \quad \text{[Equation 5]}$$

$$II_R(x, y) = k^2 II(x/k, y/k) \quad \text{[Equation 6]}$$

Therefore, a value of a point in the integral image of the image that is enlarged/reduced by a factor of k may be easily predicted by increasing a corresponding point value of the integral image of the original image by a factor of $k^2$. Using Equation 6, it is possible to predict the integral image of the image in various sizes using the integral image of the single channel feature of the original image.

FIG. 6 shows (a) an image obtained by enlarging an original image by a factor of two in the related art, (b) a feature image of a gradient component between 90° to 120°, (c) an integral image thereof, (d) an integral image of twice the size predicted using an integral image of an original image according to the present invention, and (e) a differential feature image thereof.

As illustrated in FIG. 6, there is no large difference between (c) the integral image in the related art and (d) the integral image according to the present invention. Also, the feature image restored by differentiating again has a similar distribution to (b) the feature image in the related art. This may show that, although a feature extraction time is significantly decreased compared to the related art, accuracy of the result is guaranteed.

When an integral image of the enlarged/reduced feature image is predicted, a movement direction and a trajectory of the pedestrian are detected using the predicted image (operation S700). However, before the pedestrian detecting operation (operation S700) is performed, an operation in which a pedestrian is determined using the predicted integral image of the enlarged/reduced feature image, and the pedestrian is recognized and classified may be further included (operation S500). The pedestrian information detected in this manner may be applied to pedestrian collision avoidance control and the like.

The above-described method of detecting a pedestrian through feature information prediction based on the integral image according to the present invention may be implemented as a form of a computer instruction that can be performed through various computer components and may be recorded in a computer readable recording medium. The computer readable recording medium may include a program instruction, a data file, and a data structure, and/or combinations thereof. The program instruction recorded in the computer readable recording medium may be specially designed and prepared for the invention or may be an available well-known instruction for those skilled in the field of computer software. Examples of the computer readable recording medium include, for example, magnetic media such as a hard disk, a floppy disk, and a magnetic tape, optical media such as a CD-ROM and a DVD, magneto-optical media such as a floptical disk, and a hardware device, such as a ROM, a RAM, and a flash memory, that is specially made to store and perform the program instruction. Examples of the program instruction may include a machine code generated by a compiler and a high-level language code that can be executed in a computer using an interpreter. Such a hardware device may be configured as at least one software module in order to perform operations of the invention and vice versa.

Hereinafter, a performance difference between the related art and the present invention will be evaluated with reference to FIGS. 7 and 8. In order to more accurately compare, prediction performance is evaluated such that the present invention in which an integral image of a feature image of a different size is predicted in the integral image of the feature image of an original image size using only a scale parameter is compared with the feature image that is obtained by changing the size of the original image. In addition, through comparison with a method in which a size of the image is changed and repetitive feature extraction is performed, operation time decrease performance and a final detection rate are compared to evaluate a performance difference between the present invention and the related art.

In order to perform the experiment and performance evaluation, an INRIA pedestrian DB was used. In order to measure a predicted error of the integral image, 1,208 pedestrian images (only a pedestrian region is cut) for training were used. In order to train a pedestrian detector, 2,416 images including INRIA pedestrian images for training and left-right reflections thereof, and 24,360 non-pedestrian images that are generated at random were used. 288 INRIA experiment images including a pedestrian were used to compare an operation time for the feature extracting operation and detection performance.

Predicted Error of Integral Image

An INRIA training pedestrian image has a size of 96×160 pixels. A ratio of an image height and a pedestrian height in the image is about 1:0.6. A predicted error was measured by comparing a gradient feature image of an image that is enlarged by a factor of two and a predicted gradient feature image of twice the size. The predicted gradient feature image of twice the size was obtained such that a feature integral image of an integral image having a size of 96×160 pixels is used to predict an integral image of 192×320 pixels that is twice the size and then the image is differentiated. A gradient direction has a value between 0° to 180°, and is divided by 30° to form six feature images in total. A minimum error, a maximum error, and an average error were measured based on an average error of a single image.

As shown in Table 1, the measurement result shows a value difference of a minimum of about 1 to a maximum of about 10, and an error of about 3.5 on average. This error is very small considering the fact that a value difference of a pixel can be a maximum of 255.

TABLE 1

| Error angle | Minimum error | Maximum error | Average error |
|---|---|---|---|
| 0° to 30° | 0.8 | 9.4 | 3.4 |
| 30° to 60° | 0.6 | 6.5 | 2.3 |
| 60° to 90° | 1.2 | 11.5 | 4.9 |
| 90° to 120° | 0.9 | 10.7 | 3.9 |
| 120° to 150° | 0.5 | 5.5 | 2.3 |
| 150° to 180° | 1.4 | 11.1 | 4.3 |

Figure 7A:
FIGS. 7(a)-7(c) show screens in which a feature image of an original image and a feature image predicted according to the present invention are compared.
Figure 7B:
Figure 7C:

FIG. 7 shows (a) an original image, (b) a feature image of an original image according to a gradient angle (60° to 90°), and (c) a predicted feature image. It can be understood that the predicted feature image has a greater value than the feature image of the original image. However, when a feature vector is formed, a partial region feature value is not directly used, but is compared with an entire feature value of a detection window region, and a ratio thereof is used. Accordingly, there is no great influence on pedestrian detection.

Comparison of Detection Performance

A pedestrian detection algorithm proposed by Dollár et al. (Non-Patent Literature 1 in Background Art) was used. A pedestrian model has a size of 96×160 pixels, and 10 channel features in total were used. An experiment of detection performance was performed on a pedestrian having a pedestrian region size of 80 pixels or more. Among 288 experiment images including an INRIA pedestrian, 116 images included a pedestrian having a pedestrian region (including a margin) size of 80 pixels or more, and the total number of pedestrians was 288. The following Table 2 shows the results obtained by the experiment.

Substantially the same results were obtained in a general extracting method in which repetitive image enlargement/reduction and feature extraction are performed and a prediction method using an integral image of a feature without performing repetitive image enlargement/reduction and feature extraction.

TABLE 2

| Performance method | Detection rate | The number of erroneous detection per page |
|---|---|---|
| General extracting method | 87.5% | 190 |
| Proposed extracting method | 88.2% | 193 |

Figures 8A, 8B:
FIGS. 8(a) and 8(b) show screens in which a pedestrian detection result in the related art and a pedestrian detection result according to the present invention are compared.

FIG. 8 shows (a) images of pedestrian detection results in the related art and (b) images of pedestrian detection results according to the present invention. In the results, square regions shown in the same region are not grouped. Since erroneous detection within or near the pedestrian is not discarded in initial training, much erroneous detection is shown. In the result images, similar to the results of Table 2, the results of the method proposed in the present invention have no large difference from the results of the general method.

Comparison of Operation Time

Since enlargement of a pedestrian model is equally applied to the general method and the proposed method, the part thereof was not compared, but only an operation time for enlargement of an original image was compared. In enlargement of the size of the original image, the original image was enlarged only until a ratio of a height size of the enlarged original image and a height size of the pedestrian model became a ratio of a height size of the pedestrian model of 80 pixels or more with respect to a size of an original image. Therefore, it is possible to detect a pedestrian of a height of 48 pixels or more in the original image. However, a region including the margin should not be outside the original image.

TABLE 3

| Method time (ms) | General method | Method according to the present invention |
|---|---|---|
| Image enlargement average operation time | 49.53 | 0 |
| Feature extraction average operation time | 158.6 | 0 |
| Integral image generation average operation time | 21.53 | 51.8 |
| Total operation time | 229.66 | 51.8 |

As shown in Table 3, the method proposed in the present invention showed an operation time that is four times faster than the general feature extraction method since enlargement of the image in the feature extracting operation and a repetitive feature extracting operation are not performed. Also, as shown in Table 3, repetitive feature extraction consumes the most time.

In order to detect the pedestrian in various sizes in pedestrian detection, enlargement/reduction of sizes of the pedestrian model and the original image is necessary. However, since reduction of the image causes a loss of image information, the pedestrian should be searched for without a loss of the image information while having the same effect as reduction of the image through enlargement of the pedestrian model and enlargement of the original image. Also, a repetitive operation of extracting a channel feature again used for detection when the original image is enlarged is necessary, which results in a significant increase of the operation time.

In order to address such problems, the present invention simplifies computational complexity of the feature extracting operation that consumes the most operation time due to repetitive operations and processing in pedestrian detection. An integral image of a feature is obtained for rapid calculation. A feature integral image of the enlarged image is predicted based on the initial feature integral image without repetitive feature extraction. Therefore, a computation time for the feature extracting operation was significantly decreased.

Also, the integral image predicted through various experiments shows a very small error. Accordingly, there is no decrease in the overall pedestrian detection performance. The present invention proposed a method of significantly improving the operation time in a method in which features of many more various channels are used in order to obtain better performance.

Therefore, optimization of the algorithm according to the present invention decreases an operation time for pedestrian detection may enable a quick response to a sudden accident situation. At the same time, it is possible to minimize a pedestrian detecting system cost while maintaining the same performance.

In a method of detecting a pedestrian through feature information prediction based on an integral image, and a recording medium and a terminal for performing the method according to the present invention, the pedestrian can be rapidly detected at a minimum cost. Therefore, the present invention may be mounted in vehicle pedestrian safety systems that have recently become mandatory in Europe and the USA. Also, a system for protecting and tracking the pedestrian may be built and may be beneficially used in various locations such as an intersection, a road, a bridge, a downtown, an airport and the like.

According to a method of detecting a pedestrian through feature information prediction based on an integral image, and a recording medium and a terminal for performing the method in this manner, computational complexity of a feature extracting operation that consumes the most operation time due to repetitive operations and processing in pedestrian detection is simplified. Therefore, a computation time for the feature extracting operation is significantly decreased. Accordingly, it is possible to detect the pedestrian more rapidly through performance improvement and development of hardware, and at the same time, it is possible to minimize a building cost of the pedestrian detection system.

What is claimed is:

1. A method of detecting pedestrians, the method comprising:
    extracting a first feature image of a first image;
    generating a first integral image of the first feature image;
    calculating and predicting a second integral image of a second feature image using a scale value and the first integral image; and
    detecting a pedestrian using the second integral image,
    wherein the second feature image is either enlarged or reduced in size compared to the first feature image, and wherein the scale value is a size ratio between the first feature image and the second feature image.

2. The method according to claim 1, wherein the scale value is k, and wherein the calculating and predicting are performed that a value of a point in the second integral image is calculated by multiplying $k^2$ to a corresponding point in the first integral image.

3. The method according to claim 1, wherein the calculating and predicting calculate the second integral image by the following equation:

$$II_R(x, y) = k^2 II(x/k, y/k)$$

wherein k is the scale value, wherein II is the first integral image, and wherein $II_R$ is the second integral image.

4. The method according to claim 1, wherein the extracting is performed to extract each of channel features of the first image, and wherein the generating is performed to generate an integral image to each of the channel features of the first image.

5. The method according to claim 1, wherein the method further comprises extracting a region of interest from the first image, and
    wherein, when the region of interest is greater than a size of a pedestrian image in the first image, the pedestrian image is enlarged, and when the region of interest is smaller than the size of the pedestrian image in the first image, the first image is enlarged.

6. The method according to claim 1, wherein the method further comprises recognizing and deciding the pedestrian using the second integral image.

7. A computer readable recording medium recording a computer program for performing a method of detecting pedestrians, the method comprising:
    extracting a first feature image of a first image;
    generating a first integral image of the first feature image;
    calculating and predicting a second integral image of a second feature image using a scale value and the first integral image; and
    detecting a pedestrian using the second integral image,
    wherein the second feature image is either enlarged or reduced in size compared to the first feature image, and wherein the scale value is a size ratio between the first feature image and the second feature image.

8. The computer readable recording medium recording a computer program according to claim 7, wherein the scale value is k, and wherein the calculating and predicting are performed that a value of a point in the second integral image is calculated by multiplying $k^2$ to a corresponding point in the first integral image.

9. The computer readable recording medium recording a computer program according to claim 7, wherein the calculating and predicting calculate the second integral image by the following equation:

$$II_R(x, y) = k^2 II(x/k, y/k)$$

wherein k is the scale value, wherein II is the first integral image, and wherein $II_R$ is the second integral image.

10. The computer readable recording medium recording a computer program according to claim 7, wherein the extracting is performed to extract each of channel features of the first image, and wherein the generating is performed to generate an integral image to each of the channel features of the first image.

11. The computer readable recording medium recording a computer program according to claim 7, wherein the method further comprises extracting a region of interest from the first image, and
    wherein, when the region of interest is greater than a size of a pedestrian image in the first image, the pedestrian image is enlarged, and when the region of interest is smaller than the size of the pedestrian image in the first image, the first image is enlarged.

12. The computer readable recording medium recording a computer program according to claim 7, wherein the method further comprises recognizing and deciding the pedestrian using the second integral image.

* * * * *